United States Patent
Kim et al.

(10) Patent No.: US 11,749,843 B2
(45) Date of Patent: Sep. 5, 2023

(54) BATTERY MODULE HAVING IMPROVED SAFETY, BATTERY PACK INCLUDING BATTERY MODULE, AND VEHICLE INCLUDING BATTERY PACK

(71) Applicant: LG CHEM, LTD., Seoul (KR)

(72) Inventors: Kyung-Min Kim, Daejeon (KR); Song-Taek Oh, Daejeon (KR); Jung-Seok Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 181 days.

(21) Appl. No.: 16/603,132

(22) PCT Filed: Oct. 8, 2018

(86) PCT No.: PCT/KR2018/011834
§ 371 (c)(1),
(2) Date: Oct. 4, 2019

(87) PCT Pub. No.: WO2019/103310
PCT Pub. Date: May 31, 2019

(65) Prior Publication Data
US 2020/0127337 A1   Apr. 23, 2020

(30) Foreign Application Priority Data

Nov. 23, 2017  (KR) .................. 10-2017-0157433
Aug. 24, 2018  (KR) .................. 10-2018-0099235

(51) Int. Cl.
*H01M 10/42* (2006.01)
*H01M 50/531* (2021.01)
(Continued)

(52) U.S. Cl.
CPC ......... *H01M 10/42* (2013.01); *H01M 50/105* (2021.01); *H01M 50/211* (2021.01);
(Continued)

(58) Field of Classification Search
CPC ......... H01M 10/42; H01M 50/50–531; H01M 50/572; H01M 50/10; H01M 50/578;
(Continued)

(56) References Cited

U.S. PATENT DOCUMENTS

| | | | |
|---|---|---|---|
| 5,766,793 | A | 6/1998 | Kameishi et al. |
| 6,392,172 | B1 | 5/2002 | Azema |

(Continued)

FOREIGN PATENT DOCUMENTS

| | | | |
|---|---|---|---|
| CN | 104641494 A | | 5/2015 |
| CN | 105810885 A | * | 7/2016 |

(Continued)

OTHER PUBLICATIONS

EPO machine translations of CN 105810885 originally published to Pei Zhenxing on Apr. 27, 2016 (Year: 2016).*
(Continued)

*Primary Examiner* — Cynthia H Kelly
*Assistant Examiner* — Niara Trant
(74) *Attorney, Agent, or Firm* — Birch, Stewart, Kolasch & Birch, LLP

(57) ABSTRACT

A safety element is provided to a lead connected part of a battery module in the event of overcharge, to improve safety of the battery module. The battery module according to the present disclosure includes two or more battery cells, and the battery module includes a current shut-off battery cell which electrically connects adjacent first and second battery cells, and when overcharge occurs, ruptures to disconnect the electrical connection.

18 Claims, 13 Drawing Sheets

(51) Int. Cl.
*H01M 50/105* (2021.01)
*H01M 50/211* (2021.01)
*H01M 50/514* (2021.01)
*H01M 50/51* (2021.01)
*H01M 50/583* (2021.01)
*H01M 50/119* (2021.01)
*H01M 50/129* (2021.01)
*H01M 50/121* (2021.01)

(52) U.S. Cl.
CPC ......... *H01M 50/51* (2021.01); *H01M 50/514* (2021.01); *H01M 50/531* (2021.01); *H01M 50/583* (2021.01); *H01M 50/119* (2021.01); *H01M 50/121* (2021.01); *H01M 50/129* (2021.01)

(58) Field of Classification Search
CPC ............ H01M 50/583; H01M 10/548; H01M 50/553; H01M 2200/10–103; H01M 220/20; H01M 50/574; H01M 50/83; H01M 50/502; H01M 50/509–512; H01M 50/543; H01M 50/547–555; H01M 10/557
See application file for complete search history.

(56) References Cited

U.S. PATENT DOCUMENTS

| | | | |
|---|---|---|---|
| 2005/0077878 A1* | 4/2005 | Carrier | H01M 10/441 320/134 |
| 2009/0159311 A1 | 6/2009 | Zheng et al. | |
| 2010/0316894 A1 | 12/2010 | Hermann et al. | |
| 2013/0337297 A1 | 12/2013 | Lee et al. | |
| 2014/0134464 A1 | 5/2014 | Jang et al. | |
| 2014/0242430 A1 | 8/2014 | Takahata | |
| 2015/0037642 A1* | 2/2015 | Pinon | H01M 10/4257 429/99 |
| 2015/0162593 A1 | 6/2015 | Lee | |
| 2015/0255786 A1 | 9/2015 | Hashimoto et al. | |
| 2017/0237060 A1 | 8/2017 | Inoue et al. | |
| 2018/0053976 A1 | 2/2018 | Park et al. | |

FOREIGN PATENT DOCUMENTS

| | | | | |
|---|---|---|---|---|
| EP | 3091593 A1 * | 11/2016 | ........ | H01M 10/0525 |
| JP | 2001-060457 A | 3/2001 | | |
| JP | 2005-11540 A | 1/2005 | | |
| JP | 2008-181822 A | 8/2008 | | |
| JP | 2010-171020 A | 8/2010 | | |
| JP | 2011-510433 A | 3/2011 | | |
| JP | 2013-4305 A | 1/2013 | | |
| JP | 2013-138014 A | 7/2013 | | |
| JP | 2014-086194 A | 5/2014 | | |
| KR | 1997-0024353 A | 5/1997 | | |
| KR | 10-2012-0122007 A | 11/2012 | | |
| KR | 10-2012-0128552 A | 11/2012 | | |
| KR | 10-1302077 B1 | 9/2013 | | |
| KR | 10-2014-0032833 A | 3/2014 | | |
| KR | 10-1389227 B1 | 4/2014 | | |
| KR | 10-1500229 B1 | 3/2015 | | |
| WO | WO 2014/060814 A1 | 4/2014 | | |
| WO | WO 2016/027673 A1 | 2/2016 | | |
| WO | WO 2016/171517 A1 | 10/2016 | | |

OTHER PUBLICATIONS

EPO machine translations of CN 104733685 originally published to Shin Woo Jin on Jun. 24, 2015 (Year: 2015).*
International Search Report for PCT/KR2018/011834 (PCT/ISA/210) dated Jan. 23, 2019.
Extended European Search Report for European Application No. 18882182.1, dated Jul. 23, 2020.

* cited by examiner

BATTERY MODULE HAVING IMPROVED SAFETY, BATTERY PACK INCLUDING BATTERY MODULE, AND VEHICLE INCLUDING BATTERY PACK

TECHNICAL FIELD

The present disclosure relates to a battery module, and more particularly, to a battery module for shutting off the current flow in the event of overcharge. In addition, the present disclosure relates to a battery pack comprising the battery module and a vehicle comprising the battery pack. The present application claims priority to Korean Patent Application No. 10-2017-0157433 filed in the Republic of Korea on Nov. 23, 2017, and Korean Patent Application No. 10-2018-0099235 filed in the Republic of Korea on Aug. 24, 2018, the disclosures of which are incorporated herein by reference.

BACKGROUND ART

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages of free charging and discharging, a very low self-discharge rate and high energy density.

The lithium secondary battery mainly uses lithium-based oxide and a carbon material for a positive electrode active material and a negative electrode active material respectively. The lithium secondary battery includes an electrode assembly in which unit cells are assembled, each unit cell including a positive electrode plate having a positive electrode current collector coated with the positive electrode active material and a negative electrode plate having a negative electrode current collector coated with the negative electrode active material and a separator interposed between, and a packaging material, i.e., a battery case hermetically sealed, in which the electrode assembly is received together with an electrolyte solution.

Lithium secondary batteries are classified into can-type secondary batteries in which the electrode assembly is embedded in a metal can and pouch-type secondary batteries in which the electrode assembly is embedded in a pouch of an aluminum laminate sheet, according to the shape of the battery case.

More recently, secondary batteries are being widely used in not only small devices such as portable electronic products but also medium- and large-scale devices such as vehicles and energy storage systems (ESSs). For use in medium- and large-scale devices, many secondary batteries are electrically connected to construct a battery module or a battery pack to increase the capacity and output. In particular, pouch-type secondary batteries are widely used in medium- and large-scale devices because they are easy to stack and lightweight.

A pouch-type secondary battery has a structure, in which an electrode assembly having a connected electrode lead is received in a pouch case together with an electrolyte solution, and the pouch case is hermetically sealed. A portion of the electrode lead is exposed outside the pouch case, and the exposed electrode lead is electrically connected to a device in which the secondary battery is mounted, or is used to electrically connect secondary batteries to each other.

FIGS. 1 and 2 are diagrams showing, for example, two pouch-type secondary batteries connected in series in a conventional battery module.

As shown in the drawings, the pouch-type secondary battery 10 includes an electrode lead 40 drawn out of a pouch case 30. The electrode lead 40 is divided into a positive electrode (+) lead and a negative electrode (−) lead according to the electrical polarity, and is electrically coupled to the electrode assembly 20 received in the pouch case 30 in an airtight manner. That is, the positive electrode lead is electrically coupled to the positive electrode plate of the electrode assembly 20, and the negative electrode lead is electrically coupled to the negative electrode plate of the electrode assembly 20.

There may be many methods of connecting the pouch-type secondary batteries 10 in series, and FIG. 1 shows that the electrode leads 40 are bent, and the bent electrode leads 40 are welded using a connecting bar 50 to connect the electrode leads 40, and FIG. 2 shows that the bent electrode leads 40 are connected by welding with an overlap between. In the indirect connection method of FIG. 1 or the direct connection method of FIG. 2, when a connected part of the electrode leads 40 is referred to as a lead connected part A, a plurality of pouch-type secondary batteries 10 in the battery module may be connected to each other through the lead connected part A.

Meanwhile, it is necessary to protect a secondary battery from an abnormal situation such as overcharge, overdischarge, overheat and overcurrent, and it is general to implement a secondary battery protection circuit together in a battery module or a battery pack. In particular, with the development of technology for high capacity active materials, thin separators and operation at high voltage in keeping up with higher energy density and lower cost of secondary batteries, overcharge is problematic, and solutions to fire and explosion issues in an overcharge situation are necessary. Additionally, because a lithium secondary battery uses organic solvents that are flammable, it is necessary to ensure safety when the lithium secondary battery is placed in abnormal condition due to overcharge.

However, the conventional lead connected part A is nothing but the path of current flow. For example, it is irrelevant to the function of ensuring the safety of a battery module having this connection structure. As described above, the conventional lead connected part A does not have a safety element in the event of overcharge, and thus, for example, when the overcharge prevention function of the secondary battery protection circuit does not normally work, safety is very poor.

The biggest social issue in the field of secondary batteries these days is safety problem. Explosion of battery modules or battery packs may cause damage to electronic devices or vehicles employing them and lead to user safety threats and fires, so the safety problem is recognized as an important issue. When secondary batteries are overcharged, the risk of explosion and/or fire increases, and sudden combustion or explosion caused by overcharge may cause a loss of human life and financial damage. Therefore, there is a need for introduction of an apparatus to fully ensure safety in use of secondary batteries.

DISCLOSURE

Technical Problem

The present disclosure is directed to providing a battery module with improved safety in which a safety element is provided to a lead connected part of the battery module in the event of overcharge, and a battery pack comprising the battery module and a vehicle comprising the battery pack.

These and other objects and advantages of the present disclosure will be understood by the following description and will be apparent from the embodiments of the present disclosure. Additionally, it will be readily understood that the objects and advantages of the present disclosure are realized by the means set forth in the appended claims and combinations thereof.

Technical Solution

A battery module according to the present disclosure includes two or more battery cells, including a first battery cell and a second battery cell and a current shut-off battery cell providing an electrical connection between the first battery cell and second battery cell, and when overcharge occurs, the current shut-off battery cell ruptures to disconnect the electrical connection.

In the present disclosure, each of the first battery cell, the second battery cell and the current shut-off battery cell may be a pouch-type secondary battery having an electrode assembly having two ends, each end connected to a first end of an electrode lead of opposite polarities, the electrode assembly is received in a pouch case together with an electrolyte solution and the pouch case is hermetically sealed, and a second end of the electrode lead is exposed outside of the pouch case.

In the present disclosure, the first battery cell and the current shut-off battery cell may be connected in series, and the current shut-off battery cell and the second battery cell may be connected in series.

A first electrode lead of the first battery cell and a first electrode lead of the second battery cell may be connected to each other by the electrode leads of the current shut-off battery cell.

Preferably, the first battery cell and the second battery cell are stacked in an alternating manner in a stack direction such that each alternating electrode lead has opposite polarities, and the second end of the first electrode lead of the first battery cell and the second end of the first electrode lead of the second battery cell are bent facing each other along the stack direction, and the current shut-off battery cell is placed in parallel to the stack direction between bent parts of each first electrode lead, to connect each first electrode lead.

Preferably, the current shut-off battery cell is smaller or thinner than either of the first battery cell and the second battery cell so that the current shut-off battery cell is disposed between the bent parts of each first electrode lead while not affecting a distance between the first battery cell and the second battery cell.

Preferably, the current shut-off battery cell ruptures due to the increased pressure by gas generated in the battery cell in the event of overcharge.

To this end, wherein the electrode assembly of the current shut-off battery cell has a stack of a negative electrode plate, a separator and a positive electrode plate, the positive electrode plate may include a positive electrode current collector, and a positive electrode active material layer formed on the positive electrode current collector, and the positive electrode active material layer may include a positive electrode active material, a gas generating material, a conductive material and a binder.

The gas generating material may be one selected from the group consisting of lithium carbonate ($Li_2CO_3$), calcium carbonate ($CaCO_3$), Lithium Nickel Oxide (LNO) and lithium oxalate, or mixtures thereof.

The gas generating material may be included in the positive electrode plate in an amount of 0.1 to 20 weight % based on the total weight of the positive electrode active material and the gas generating material.

The positive electrode active material layer may be a porous structure in which the gas generating material is bonded and immobilized by the binder, and pores are formed by voids in the gas generating material.

The positive electrode active material and the gas generating material may be blended together.

Alternatively, the positive electrode active material layer may include a primer layer and an active material coating layer, the primer layer may include the gas generating material, the conductive material and the binder, and the active material coating layer may include the positive electrode active material, the conductive material and the binder.

The gas generating material may be present in an amount of 90 to 99.9 weight % of solids in the primer layer.

A bimetal may be used in the first battery cell or the second battery cell or the electrode lead of the current shut-off battery cell, so that the electrode lead may bend by a temperature rise in the event of overcharge, and the pouch case of the current shut-off battery cell may break and rupture.

Additionally, the present disclosure provides a battery pack including at least one battery module according to the present disclosure, and a pack case which the packages the at least one battery module.

Further, the present disclosure provides a vehicle including at least one battery pack according to the present disclosure.

Advantageous Effects

According to the present disclosure, a battery module includes a current shut-off battery cell between adjacent battery cells, and thus when overcharge occurs while the battery module is being used and the voltage of the current shut-off battery cell exceeds the threshold, for example, a particular voltage, the current shut-off battery cell ruptures to shut off the current flow. Accordingly, even though the secondary battery protection circuit does not operate, the current flow is shut off to stop charging, thereby increasing the safety of the battery module. As described above, the battery module of the present disclosure implements means for automatically shutting off the current flow using the current shut-off battery cell in the event of overcharge, and accordingly, in addition to the overcharge prevention function of the secondary battery protection circuit, it is possible to doubly ensure the safety of the battery module.

According to the present disclosure, there may be provided a battery module including a current shut-off battery cell between adjacent battery cells to establish a series connection, forming an electrical connection path. When overcharge occurs such as a situation in which a particular voltage is reached, gas is generated from a gas generating material included in a positive electrode plate of the current shut-off battery cell. The current shut-off battery cell may be so small or thin that it can be disposed between the adjacent battery cells, and is likely to rupture by gas generated therein. As a result, the electrical connection of the adjacent battery cells is disconnected and the current flow is shut off, ensuring safety of the battery module.

According to the present disclosure, the lead connected part of the battery module has a safety element or a current shut-off battery cell. The safety element is not a Current Interrupt Device (CID) type connector of a simple structure or a fuse that melts, and a "battery cell" type current shut-off battery cell is used to safely shut off the current when an overcharge situation occurs. The current shut-off battery cell is advantageous in terms of resistance, compared to the connector or the fuse.

According to the present disclosure, safety may be increased only by adding the current shut-off battery cell to the lead connected part without changing the battery cell of the battery module. There is no need to change the existing battery cell, for example, installing a fuse in the electrode lead. Additionally, the current shut-off principle of the present disclosure is not intended to break or melt the electrode leads of the connected battery cells. Only the current shut-off battery cell ruptures to disconnect the electrical connection. A major advantage of having no change in battery cell of the battery module is mass production of battery modules or no change in resistance on cell scale.

In particular, it is possible to respond to an "overcharge" situation, not an overdischarge or overcurrent situation, by shutting off the current at a particular voltage through control of the gas generating material included in the positive electrode plate of the current shut-off battery cell. For example, in case that lithium carbonate is used as the gas generating material, when the voltage of the current shut-off battery cell reaches 4.8V due to overcharge, $Li_2CO_3$ decompose into $CO+CO_2$ gas and the internal pressure increases rapidly, and thus the current shut-off battery cell may rupture.

As described above, according to the present disclosure, the safety element is provided to the lead connected part in the event of overcharge, thereby improving the safety of the battery module, a battery pack including the battery module and a vehicle including the battery pack.

BRIEF DESCRIPTION OF THE DRAWINGS

The accompanying drawings illustrate preferred embodiments of the present disclosure, and together with the following detailed description, serve to provide a further understanding of the technical aspects of the present disclosure, and thus, the present disclosure is not construed as being limited to the drawings.

MODE FOR CARRYING OUT THE INVENTION

Figure 1:
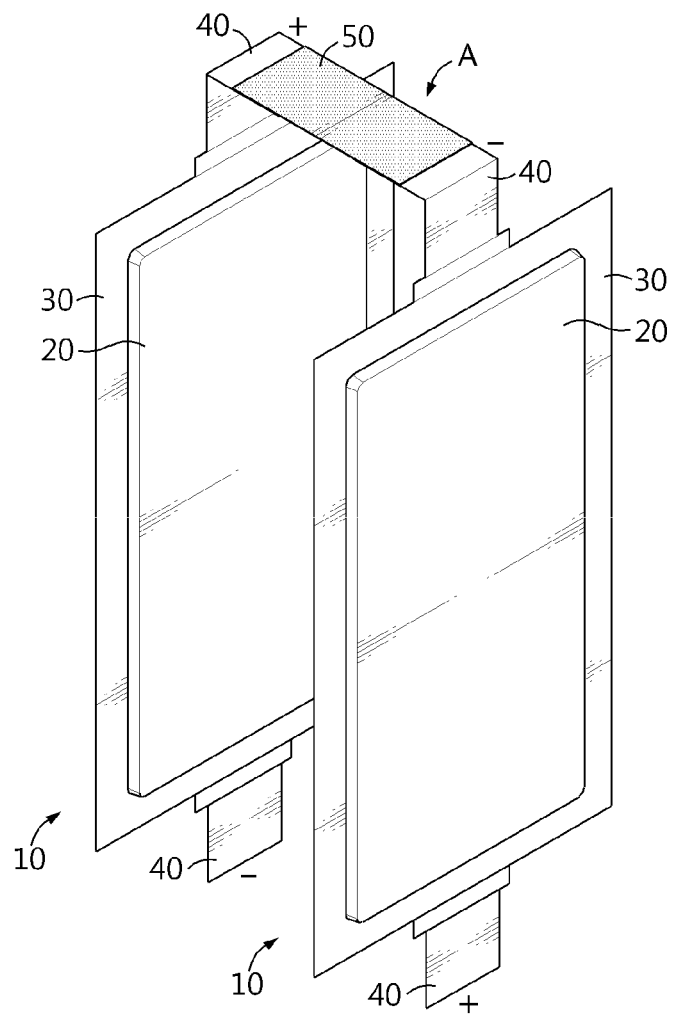
FIGS. 1 and 2 are diagrams showing, for example, two pouch-type secondary batteries connected in series in a conventional battery module.

Hereinafter, the preferred embodiments of the present disclosure will be described in detail with reference to the accompanying drawings. Prior to the description, it should be understood that the terms or words used in the specification and the appended claims should not be construed as limited to general and dictionary meanings, and should be interpreted based on the meanings and concepts corresponding to technical aspects of the present disclosure on the basis of the principle that the inventor is allowed to define terms appropriately for the best explanation.

Therefore, the embodiments described herein and illustrations shown in the drawings are just a most preferred embodiment of the present disclosure, but not intended to fully describe the technical aspects of the present disclosure, so it should be understood that other equivalents and modifications could be made thereto at the time of filing the application. In the drawings, like reference numerals denote like elements.

In the embodiments described below, a secondary battery refers to a lithium secondary battery. Here, the lithium secondary battery refers collectively to secondary batteries in which lithium ions act as working ions during charging and discharging, causing electrochemical reactions at the positive electrode plate and the negative electrode plate.

Meanwhile, it should be interpreted as that even though the name of the secondary battery changes depending on the type of electrolyte or separator used in the lithium secondary battery, the type of battery case used to package the secondary battery and the internal or external structure of the lithium secondary battery, the lithium secondary battery covers any secondary battery using lithium ions as working ions.

The present disclosure may be also applied to secondary batteries other than lithium secondary batteries. Accordingly, it should be interpreted as that the present disclosure covers any type of secondary battery to which the technical aspects of the present disclosure may be applied, though working ions are not lithium ions.

Figure 3:
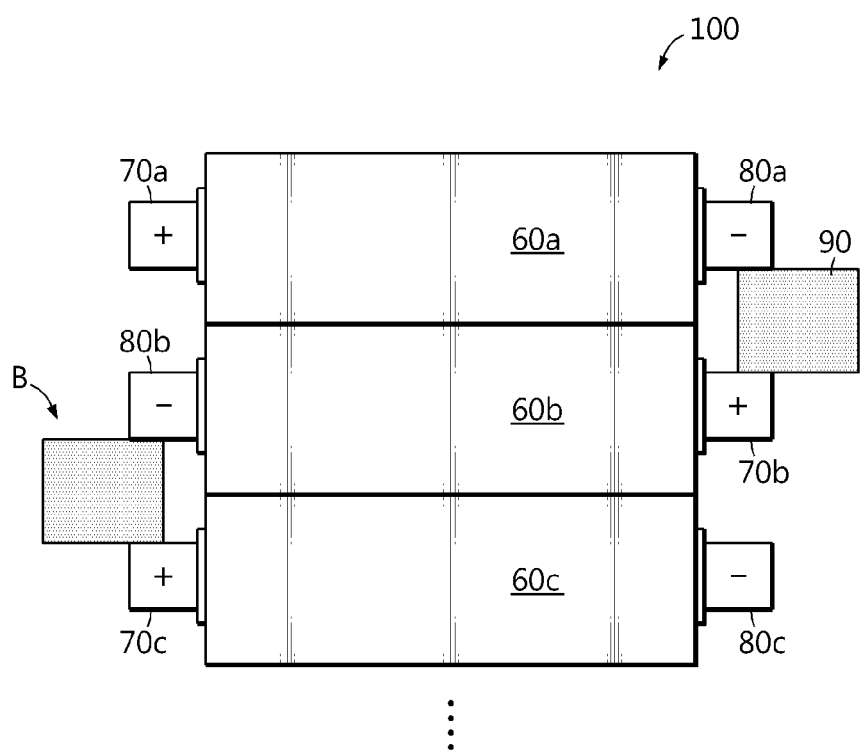
FIG. 3 is a schematic diagram showing a battery module according to an embodiment of the present disclosure.

FIG. 3 is a schematic diagram showing a battery module according to an embodiment of the present disclosure.

Referring to FIG. 3, the battery module 100 includes two or more battery cells 60a, 60b, 60c, . . . . Each battery cell 60a, 60b, 60c, . . . may be a secondary battery. Each battery cell 60a, 60b, 60c, . . . may have a positive electrode lead 70a, 70b, 70c, . . . and a negative electrode lead 80a, 80b, 80c, . . . . The positive electrode lead 70a, 70b, 70c, . . . and the negative electrode lead 80a, 80b, 80c, . . . are electrically connected through a lead connected part B, and adjacent battery cells 60a, 60b, 60c, . . . are connected to each other. The lead connected part B may be an indirect connection as described with reference to FIG. 1 or a direct connection as described with reference to FIG. 2.

In the related art described with reference to FIGS. 1 and 2, the lead connected part A does not have a safety element in the event of overcharge. However, in the present disclosure, at least one of lead connected parts B includes a current shut-off battery cell 90. The current shut-off battery cell 90 is a safety element that shuts off the current flow in the event of overcharge. It is necessary to protect a secondary battery from an abnormal situation such as overcharge, overdischarge, overheat and overcurrent, and the present disclosure provides a battery module that can protect a secondary battery from overcharge.

FIG. 3 shows that the current shut-off battery cell 90 is included, for example, between adjacent two battery cells, a first battery cell 60a and a second battery cell 60b. The current shut-off battery cell 90 electrically connects the first battery cell 60a and the second battery cell 60b adjacent to each other, and in the event of overcharge, ruptures to disconnect the electrical connection in order to shut off the current flow.

The current shut-off battery cell 90 may be also a secondary battery. The current shut-off battery cell 90 may also have a positive electrode lead and a negative electrode lead. When the positive electrode lead of the current shut-off battery cell 90 is connected to the negative electrode lead 80a of the first battery cell 60a, and the negative electrode lead of the current shut-off battery cell 90 is connected to the positive electrode lead 70b of the second battery cell 60b, a series connection may be established as shown in FIG. 3. The connection between each lead may be made through, for example, ultrasonic welding, resistance welding, laser welding and a conductive adhesive, but the present disclosure is not limited thereto.

At least one current shut-off battery cell 90 may be included in one battery module 100. The current shut-off battery cell 90 may be included in each lead connected part B, but many battery cells 60a, 60b, 60c, . . . are electrically connected to form the battery module 100 having one current flow path, and thus even though only one of the lead connected parts B includes the current shut-off battery cell 90, the electrical connection may be disconnected in the event of overcharge.

Preferably, the current shut-off battery cell 90 ruptures due to the increased pressure by gas generated in the battery cell at a particular voltage in the event of overcharge. The principle is that when the internal pressure is more than the sealing strength of the battery case of the current shut-off battery cell 90 due to gas generation, the battery case breaks and ruptures. In another example, the current shut-off battery cell 90 uses a bimetal, and in the event of overcharge, the bimetal bends by a temperature rise, and the battery case of the current shut-off battery cell 90 may break and rupture. The former shuts off the current at a particular voltage or more in the event of overcharge, while the latter is used in the event of overcharge accompanied with a temperature rise.

Meanwhile, conventionally, there is known technology that includes lithium carbonate in the positive electrode active material layer to greatly increase the resistance of the positive electrode plate enough to reach the overcharge end voltage. The present disclosure uses a gas generating material such as lithium carbonate, but it should be noted that the present disclosure increases the resistance of the positive electrode plate up to the overcharge end voltage, and further, increases the internal pressure more than the sealing strength of the battery case of the current shut-off battery cell 90 due to gas generation, so that the battery case breaks and ruptures to physically shut off the electrical connection path.

The related art described with reference to FIGS. 1 and 2 does not have a safety element at the lead connected part A in the event of overcharge, but the present disclosure includes the current shut-off battery cell 90 as a safety element at the lead connected part B in the event of overcharge. It should be noted that the safety element is not implemented as a CID type connector of a simple structure or a fuse that melts, and is implemented in the form of a "battery cell". Due to this, it is possible to shut off the current safely in the event of overcharge. Because the current shut-off battery cell 90 is implemented in the form of a "battery cell", it is advantageous in terms of resistance compared to the connector or the fuse. If the fuse is inserted into the lead connected part A in the related art shown in FIG. 1 or 2, the resistance will be higher than the resistance when the fuse is not inserted into the lead connected part A. In addition, the fuse is difficult to respond to an overcharge situation. The fuse only operates when the temperature of the secondary battery rises by resistance heat generation in the event that an overcurrent flows, and thus an overcharge situation accompanied with no temperature rise will be insufficient to ensure safety. The present disclosure includes the current shut-off battery cell 90, and it is advantageous because this does not act as a resistance component.

According to the present disclosure, it is possible to increase the safety by adding only the current shut-off battery cell 90 to the lead connected part B without changing the battery cells 60a, 60b, 60c, . . . that make up the battery module 100. There is no need to change the existing battery cell such as installing the fuse in the electrode lead. Additionally, the current shut-off principle of the present disclosure is not breaking or melting the electrode leads of the connected battery cells. This is, without changing the existing battery cell to form a mechanically weak structure or a structure that melts at a specified temperature, only the current shut-off battery cell 90 ruptures to disconnect the electrical connection. A major advantage of having no change in battery cell of the battery module is mass production of battery modules or no change in resistance on cell scale.

Figure 4:
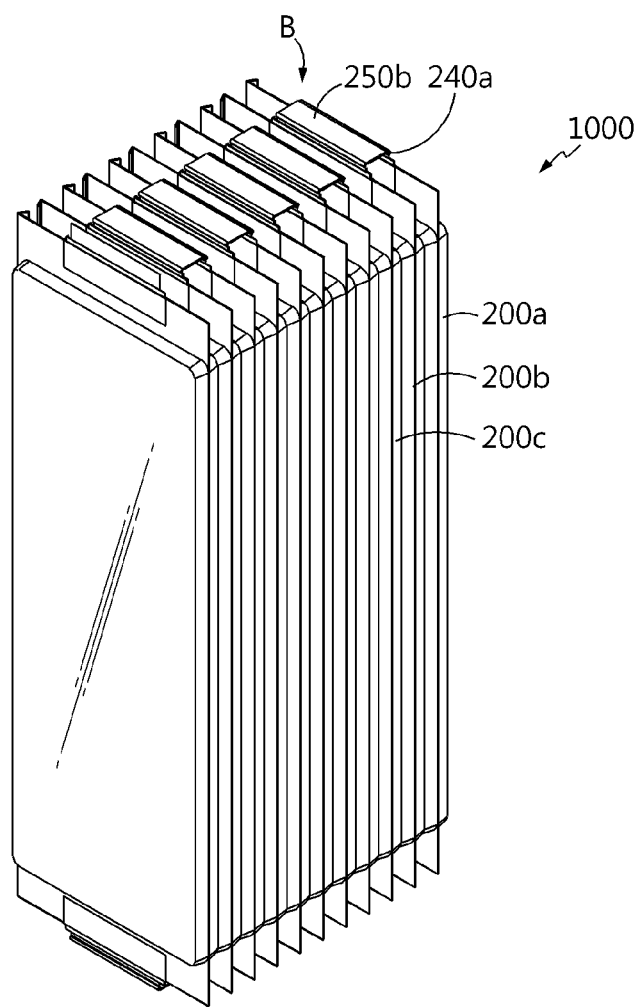
FIG. 4 is a schematic diagram showing a battery module according to another embodiment of the present disclosure.
Figure 5:
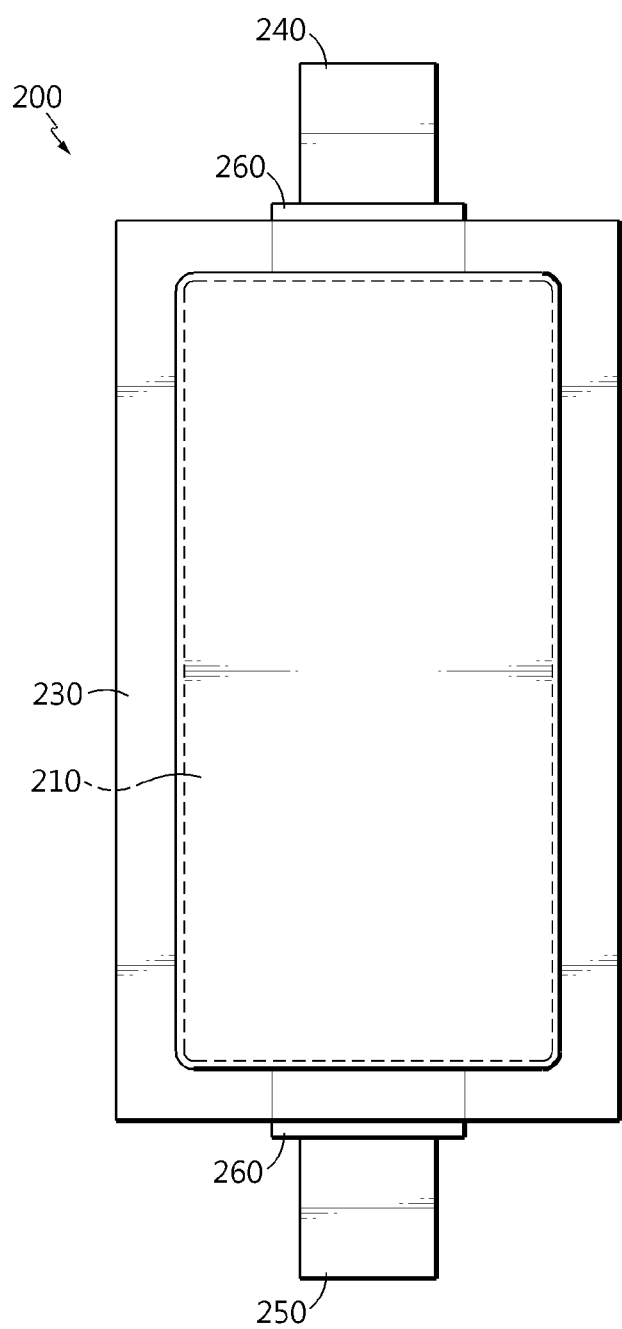
FIG. 5 is a top view of a pouch-type secondary battery as a unit battery cell included in the battery module of FIG. 4.
Figure 6:
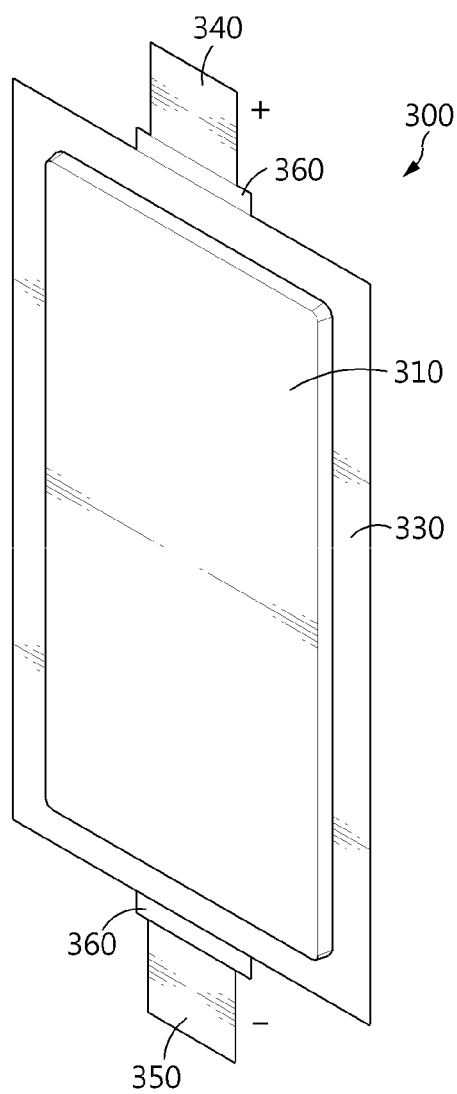
FIG. 6 is a top view of a current shut-off battery cell included in the battery module of FIG. 4.

The present disclosure is not limited to a particular type, number and connection method of the battery cells 60a, 60b, 60c, . . . included in the battery module 100, but the battery cells 60a, 60b, 60c, . . . may be, in particular, a pouch-type secondary battery. The present disclosure is not limited to a particular type, number and connection method of the current shut-off battery cell 90, but the current shut-off battery cell 90 may be also, in particular, a pouch-type secondary battery. Hereinafter, the present disclosure will be described in more detail by describing an embodiment in which the battery cells of the battery module and the current shut-off battery cell are all pouch-type secondary batteries. FIG. 4 is a schematic diagram showing a battery module according to another embodiment of the present disclosure. FIG. 5 is a top view of a pouch-type secondary battery as a unit battery cell included in the battery module of FIG. 4. FIG. 6 is a top view of a current shut-off battery cell included in the battery module of FIG. 4.

FIG. 4 shows the battery module 1000 including, for example, a plurality of battery cells 200a, 200b, 200c, . . . electrically connected in series. As shown in FIG. 5, each of the plurality of battery cells 200a, 200b, 200c, . . . is a pouch-type secondary battery 200 and has the same structure.

Referring to FIG. 5, the pouch-type secondary battery 200 includes an electrode assembly 210 and an electrolyte solution received in a pouch case 230 that is hermetically sealed. The pouch case 230 having the electrode assembly 210 and the electrolyte solution received therein is hermetically sealed, and to protect them from the outside, may include a metal layer, an outer resin layer and an inner resin layer.

One end of a positive electrode lead 240 and a negative electrode lead 250 formed in the shape of a plate is each coupled to two ends of the electrode assembly 210, and the other end is each exposed outside of the pouch case 230. One end of the positive electrode lead 240 is electrically connected to the positive electrode plate of the electrode assembly 210, and one end of the negative electrode lead 250 is electrically connected to the negative electrode plate of the electrode assembly 210. The other end of the electrode leads 240, 250 exposed outside of the pouch case 230 is used to electrically connect many pouch-type secondary batteries as shown in FIG. 4.

A lead film 260 is interposed between the pouch case 230 and the electrode leads 240, 250. The lead film 260 is provided to further improve the adhesion between the pouch case 230 and the electrode leads 240, 250. The lead film 260 may prevent a short from occurring between the electrode leads 240, 250 and the metal layer of the pouch case 230, and improve the sealability of the pouch case 230. In thermal welding of the metal electrode leads 240, 250 to the polymer pouch case 230, the contact resistance is somewhat large, reducing the surface adhesive strength. However, as in the above-described embodiment, with the lead film 260, this adhesion reduction phenomenon may be prevented. Additionally, the lead film 260 is made of an insulating material which desirably, may shut off the current applied from the electrode leads 240, 250 to the pouch case 230. The lead film 260 is formed from a film having insulating and thermally weldable properties. For example, the lead film 260 may be formed of a material layer (a single film or a multi-film) of at least one selected from polyimide (PI), polypropylene, polyethylene and polyethylene terephthalate (PET).

The electrode assembly 210 is an assembly of unit cells, each unit cell having a structure in which a positive electrode plate and a negative electrode plate are arranged with a separator interposed between. The unit cells may be simply stacked, may be stacked and folded, or may be manufactured into a jellyroll type electrode assembly. Methods of manufacturing many types of electrode assemblies are widely known and its detailed description is omitted herein. For example, the electrode assembly 210 may be a stack of a negative electrode plate, a separator and a positive electrode plate. The electrode assembly 210 may be a monocell type including negative electrode plate/separator/positive electrode plate, or a bicell type including negative electrode plate/separator/positive electrode plate/separator/negative electrode plate or positive electrode plate/separator/negative electrode plate/separator/positive electrode plate. Although this embodiment cites a bidirectional battery having the positive electrode lead 240 and the negative electrode lead 250 drawn in opposite directions from the pouch case 230, a unidirectional battery embodiment in which both the positive electrode lead 240 and the negative electrode lead 250 are drawn in one direction from the pouch case 230 is not excluded.

Referring to FIGS. 4 and 5 together, the battery cells 200a, 200b are stacked such that the electrode leads extend from two ends and have the opposite polarities, for example, the positive electrode lead 240a of the battery cell 200a is placed in parallel to the negative electrode lead 250b of the battery cell 200b. This is, many battery cells are stacked in an alternating manner such that electrode leads placed in parallel have the opposite polarities. There may be many methods of connecting the battery cells 200a, 200b, 200c, . . . in series, and FIG. 4 shows that the other ends of the electrode leads 240a, 250b are bent left or right to provide flat contact surfaces, and they are connected by welding with an overlap between. This is, in FIG. 4, the lead connected part B described in FIG. 3 is formed by bending and connecting the battery cell electrode leads 240a, 250b, and the battery cells 200a, 200b, 200c, . . . of the battery module 1000 are connected to each other through the lead connected part B.

In FIG. 4, a total of eleven battery cells are included. The electrode lead of each battery cell is vertically bent, and overlaps the vertically bent part of the electrode lead of another neighboring battery cell to form the lead connected part B. More specifically, electrode leads on the inner side except electrode leads disposed at the outermost on one side of the stacked battery cells 200a, 200b, 200c, . . . are bent and arranged with an overlap between, and the bent electrode lead parts are electrically connected to each other. On the other side of the stacked battery cells 200a, 200b, 200c, . . . , all electrode leads are bent and welded with an overlap between, to electrically connect the bent electrode lead parts.

In FIG. 4, the battery cells 200a, 200b, 200c, . . . are stacked standing in the vertical direction. When bending the electrode leads, an electrode lead on one side of the battery cell is vertically bent in the right (or outward the battery module) direction and an electrode lead on the other side is vertically bent in the left (or inward the battery module) direction. Accordingly, the electrode leads of different polarities are bent in the shape of '⊏' such that the lead connected parts B to be coupled overlap. Additionally, the lead connected parts B are arranged in parallel along the horizontal direction. This process may be performed in a reverse order, and for example, electrode leads may be bent, and in this bent state, battery cells may be stacked and the corresponding part may be welded.

Figure 2:
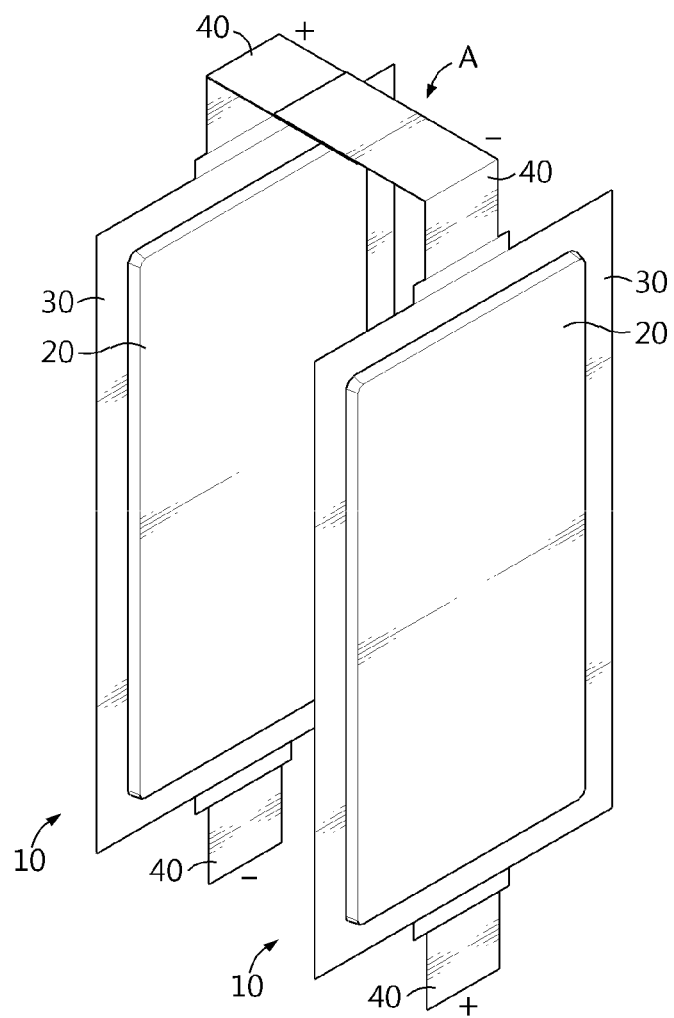

Meanwhile, although FIG. 4 shows the method that directly connects the electrode leads with an overlap between, the indirect connection method using a connecting bar as described with reference to FIG. 1 is possible. For example, of course, the present disclosure may be applied to a battery module manufactured by welding electrode leads and a busbar together or by welding electrode leads and an external circuit. The battery module 1000 of this embodiment includes a current shut-off battery cell 300 in the lead connected part B as shown in FIG. 6.

Referring to FIG. 6, the current shut-off battery cell 300 is also received in a pouch case 330 that is hermetically sealed, together with an electrode assembly 310 and an electrolyte solution. The pouch case 330 of the current shut-off battery cell 300 may receive the electrode assembly 310 and the electrolyte solution therein in an airtight manner, and to protect them from the outside, include a metal layer, an outer resin layer and an inner resin layer.

The other end of a positive electrode lead 340 and a negative electrode lead 350 formed in the shape of a plate is each connected to two ends of the electrode assembly 310, and exposed outside of the pouch case 330. One end of the positive electrode lead 340 is electrically connected to the positive electrode plate of the electrode assembly 310, and one end of the negative electrode lead 350 is electrically connected to the negative electrode plate of the electrode assembly 310. A lead film 360 is interposed between the pouch case 330 and the electrode leads 340, 350. The lead film 360 is provided to further improve the adhesion between the pouch case 330 and the electrode leads 340, 350. The other end of the electrode leads 340, 350 exposed outside is used to electrically connect the battery cells 200a, 200b as shown in FIG. 7.

Also, here, the electrode assembly 310 is an assembly of unit cells, each unit cell having a structure in which a positive electrode plate and a negative electrode plate are arranged with a separator interposed between. The unit cells may be simply stacked, may be stacked and folded, or may be manufactured into a jellyroll type electrode assembly. For example, the electrode assembly 310 may be a stack of the negative electrode plate, the separator and the positive electrode plate. The electrode assembly 310 may be a monocell type including negative electrode plate/separator/positive electrode plate, or a bicell type including negative electrode plate/separator/positive electrode plate/separator/negative electrode plate or positive electrode plate/separator/negative electrode plate/separator/positive electrode plate. Although this embodiment cites a bidirectional battery having the positive electrode lead 340 and the negative electrode lead 350 drawn in opposite directions from the pouch case 330, a unidirectional battery embodiment in which both the positive electrode lead 340 and the negative electrode lead 350 are drawn in one direction from the pouch case 330 is not excluded.

Figure 7:
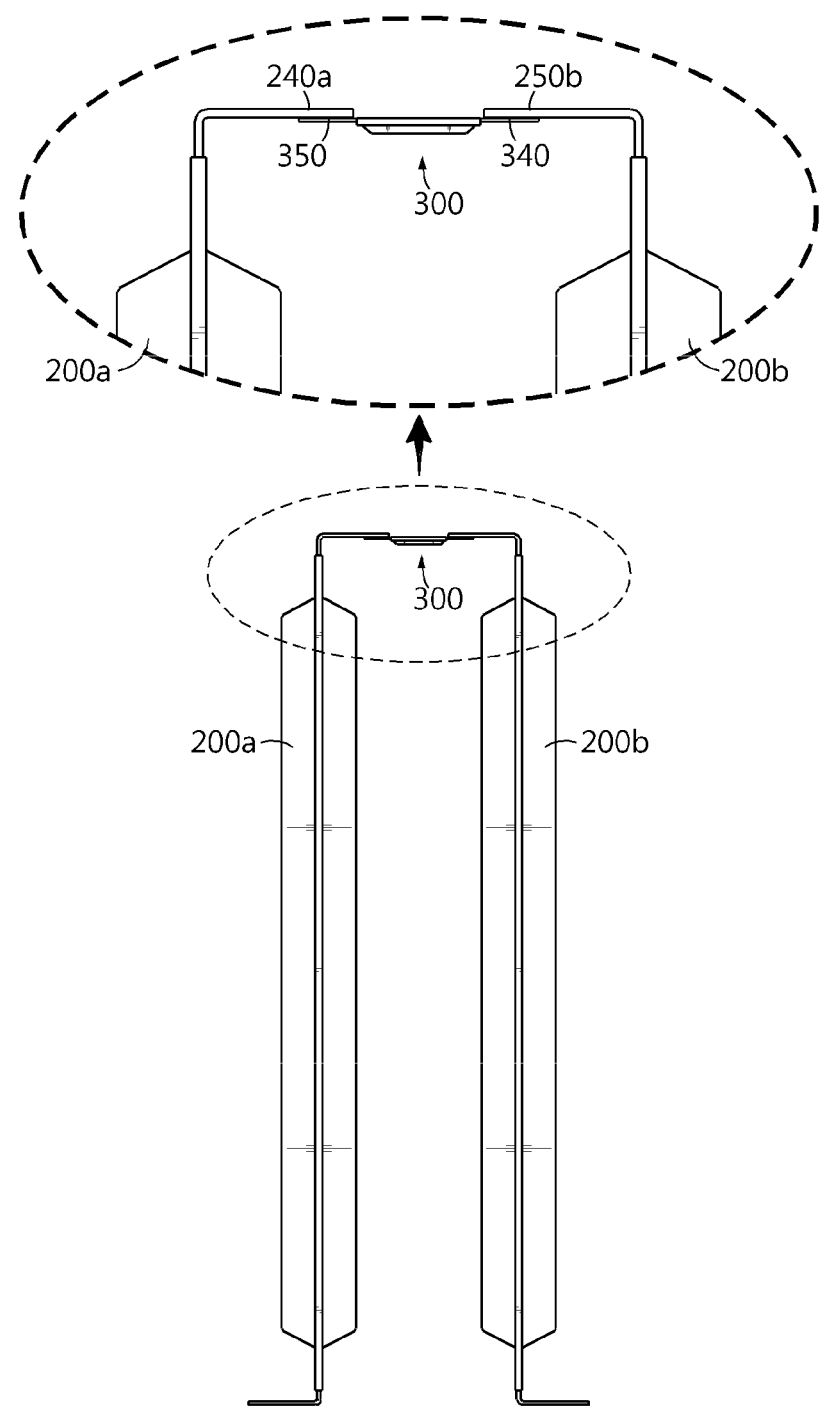
FIG. 7 is a schematic diagram showing an embodiment in which a current shut-off battery cell may be connected between adjacent two battery cells in the battery module of FIG. 4.

FIG. 7 is a schematic diagram showing an embodiment in which the current shut-off battery cell may be connected between adjacent two battery cells in the battery module of FIG. 4.

Describing FIG. 7 together with FIG. 4, when two adjacent battery cell in the battery module 1000 are referred to as a first battery cell 200a and a second battery cell 200b, the first battery cell 200a and the current shut-off battery cell 300 are connected in series, and the current shut-off battery cell 300 and the second battery cell 200b are connected in series. Specifically, the negative electrode lead 350 of the current shut-off battery cell 300 is connected to the positive electrode lead 240a of the first battery cell 200a, and the positive electrode lead 340 of the current shut-off battery cell 300 is connected to the negative electrode lead 250b of the second battery cell 200b. As described above, the positive electrode lead 240a of the first battery cell 200a and the negative electrode lead 250b of the second battery cell 200b are connected to each other by the medium of the electrode leads 340, 350 of the current shut-off battery cell 300, so the first and second battery cells 200a, 200b are electrically connected to each other. The connection may be made by methods commonly used in the art, and coupling and connection may be accomplished by, for example, ultrasonic welding, but is not limited thereto.

Even though the positive electrode lead 240a of the first battery cell 200a and the negative electrode lead 250b of the second battery cell 200b are not directly connected, there is no problem with the resistance of the battery module 1000. Additionally, to maintain the distance between the battery cells 200a, 200b, 200c, . . . in the battery module 1000 shown in FIG. 4, only the electrode lead of the connected part with the current shut-off battery cell 300 may be shorter than the electrode lead of other part.

In the present disclosure, the locations of the two adjacent battery cells electrically connected by the current shut-off battery cell 300 are not particularly limited. For example, battery cells in the middle of the battery module 1000 may be electrically connected by the current shut-off battery cell 300, or battery cells disposed at the outermost of the battery module 1000 may be electrically connected by the current shut-off battery cell 300.

It is necessary to determine the size of the current shut-off battery cell 300, considering the space in which the current shut-off battery cell 300 is placed. In this embodiment, the other end of the positive electrode lead 240a of the first battery cell 200a and the other end of the negative electrode lead 250b of the second battery cell 200b are bent facing each other along the stack direction of the first and second battery cells 200a, 200b, and the current shut-off battery cell 300 is placed parallel to the stack direction between the bent parts of each electrode lead 240a, 250b to connect each electrode lead 240a, 350, 340, 250b.

As shown in FIG. 7, the current shut-off battery cell 300 is preferably smaller or thinner than the first battery cell 200a and the second battery cell 200b so that the current shut-off battery cell 300 is disposed between the bent parts of each electrode lead 240a, 250b while not affecting the distance between the first battery cell 200a and the second battery cell 200b.

For example, it is desirable to design the current shut-off battery cell 300 that is smaller than a gap (distance) between two places where electrode leads are drawn from two adjacent battery cells. Additionally, to ease the welding with the electrode lead of the adjacent battery cell, the current shut-off battery cell 300 is preferably equal or similar to the thickness of the electrode lead of the adjacent battery cell without a big difference. As described above, when the current shut-off battery cell 300 is small and thin, it is only necessary to mount the current shut-off battery cell 300 in the lead connected part B, and it is not necessary to allocate a separate space for mounting the current shut-off battery cell 300.

In this embodiment, the current shut-off battery cell 300 electrically connects the first battery cell 200a and the second battery cell 200b adjacent to each other, and in the event of overcharge, ruptures to disconnect the electrical connection. The electrical connection between the first battery cell 200a and the second battery cell 200b is disconnected by the rupture of the current shut-off battery cell 300 due to gas generation in the current shut-off battery cell 300 when the battery module 1000 is overcharged, for example, the battery module 1000 reaches a particular voltage, for example, 5.0 V, thereby ensuring safety in the event of overcharge.

According to this embodiment, the current shut-off battery cell 300 may be included between the adjacent battery cells 200a, 200b to establish a series connection, forming an electrical connection path. When overcharge occurs such that a situation in which a particular voltage is reached, the current shut-off battery cell 300 may be configured to generate gas from a gas generating material included in the positive electrode plate. The current shut-off battery cell 300 may be so small or thin that it can be disposed between the adjacent battery cells 200a, 200b, and is likely to rupture due to gas generated therein. As a result, the electrical connection of the adjacent battery cells 200a, 200b may be disconnected to shut off the current flow, thereby ensuring safety of the battery module 1000.

Figure 8:
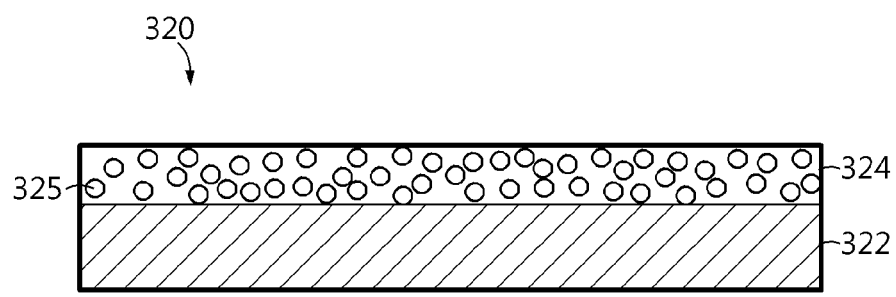
FIG. 8 is a cross-sectional view illustrating an embodiment of a positive electrode plate in an electrode assembly included in the current shut-off battery cell of FIG. 6.

FIG. 8 is a cross-sectional view illustrating an embodiment of the positive electrode plate in the electrode assembly included in the current shut-off battery cell of FIG. 6.

Referring to FIG. 8, the positive electrode plate 320 includes a positive electrode current collector 322 and a positive electrode active material layer 324.

The positive electrode active material layer 324 is formed on the positive electrode current collector 322, and includes a positive electrode active material, a gas generating material 325, a conductive material and a binder. The positive electrode active material and the gas generating material 325 may be blended together. This is, the gas generating material 325 may be uniformly distributed in the positive electrode active material layer 324. Accordingly, in forming the positive electrode plate 320, the gas generating material 325 is introduced into a binder solution together with the positive electrode active material and the conductive material and shaken to form a gas generating material blended positive electrode active material slurry which is then coated on at least one of two surfaces of the positive electrode current collector 322 to form the positive electrode active material layer 324. After coating of the gas generating material blended positive electrode active material slurry, drying and pressing may be performed if necessary.

The 'gas generating material' used herein refers to a material that generates gas at a particular voltage, and non-limiting examples may include lithium carbonate ($Li_2CO_3$), calcium carbonate ($CaCO_3$), Lithium Nickel Oxide (LNO) and lithium oxalate. Preferably, the gas generating material 325 included in the positive electrode active material layer 324 may be one selected from the group consisting of lithium carbonate, calcium carbonate, lithium nickel oxide and lithium oxalate, or mixtures thereof.

In particular, it is possible to shut off the current at a particular voltage through the control of the gas generating material 325 included in the positive electrode plate 320 of the current shut-off battery cell 300. For the gas generating material 325, those that decompose into gas at a particular voltage set to an overcharge voltage according to the battery model are selected. For example, it is necessary to shut off the current to stop charging at 4.5V or above that is commonly recognized as an overcharge condition. For example, lithium carbonate is suitable as the gas generating material 325 because it decomposes at 4.8V or above. For example, in case that lithium carbonate is used for the gas generating material 325, when 4.8V is reached due to overcharge, $Li_2CO_3$ decomposes into $CO+CO_2$ gas and the internal pressure rapidly increase, and accordingly the current shut-off battery cell 300 may rupture.

The gas generating material 325 may be included in the positive electrode plate 320 in an amount 0.1 to 20 weight % based on the total weight of the positive electrode active material and the gas generating material 325. When the gas generating material 325 is included in the above-described amount, gas may be generated and the current shut-off battery cell 300 may rupture in the event of overcharge.

The gas generating material 325 particles, in particular lithium carbonate particles, may have, for example, spherical, oval and polygonal shapes, but are not limited thereto. Additionally, the 'spherical' and 'oval' shapes as used herein refer to a wide range of spherical and oval shapes, including not only completely or perfectly 'spherical' and 'oval' shapes, but also spherical and oval shapes including distorted portions or spherical and oval shapes of commonly acceptable level. The lithium carbonate particles may have a particle size of 0.1 to 50 μm.

The positive electrode active material used in the current shut-off battery cell 300 is not limited to a particular type, and may be identical to or different from the positive electrode active material of the battery cells 200a, 200b, 200c, . . . used in the battery module 1000. For example, the positive electrode active material may include layered compounds such as lithium cobalt oxide ($LiCoO_2$) and lithium nickel oxide ($LiNiO_2$) or compounds with one or more transition metal substitution; lithium manganese oxide of formulae $L_{1+x}Mn_{2-x}O_4$ (x is 0~0.33), $LiMnO_3$, $LiMn_2O_3$, $LiMnO_2$; lithium copper oxide ($Li_2CuO_2$); vanadium oxide such as $LiV_3O_8$, $LiFe_3O_4$, $V_2O_5$, $Cu_2V_2O_7$; Ni site lithium nickel oxide represented by chemical formula $LiN_{1-x}M_xO_2$ (M=Co, Mn, Al, Cu, Fe, Mg, B or Ga, x=0.01~0.3); lithium manganese composite oxide represented by chemical formula $LiMn_{2-x}M_xO_2$ (M=Co, Ni, Fe, Cr, Zn or Ta, x=0.01~0.1) or $Li_2Mn_3MO_8$ (M=Fe, Co, Ni, Cu or Zn); lithium manganese composite oxide of spinel structure such as $LiNi_xMn_{2-x}O_4$ (x=0.01~0.6); $LiMn_2O_4$ with partial substitution of alkali earth metal ion for Li in chemical formula; disulfide compounds; and $Fe_2 (MoO_4)_3$, but is not limited thereto.

The conductive material is generally added in an amount of 1 to 50 weight % based on the total weight of the mixture including the positive electrode active material. The conductive material is not limited to any particular type when the material has conductivity while not causing a chemical change to the corresponding battery, and may include, for example, graphite such as natural graphite or artificial graphite; carbon black such as carbon black, acetylene black, ketjen black, channel black, furnace black, lamp black and thermal black; conductive fibers such as carbon fibers or metal fibers; metal powder such as fluorocarbon, aluminum and nickel powder; conductive whisker such as oxide zinc and potassium titanate; conductive metal oxide such as titanium oxide; and conductive materials such as polyphenylene derivatives.

The binder assists in binding the active material to the gas generating material and the conductive material and to the current collector, and is generally added in an amount of 1 to 50 weight % based on the total weight of the mixture including the positive electrode active material. Examples of the binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene ter polymer (EPDM), sulfonated EPDM, styrene-butadiene rubber, fluorine rubber and a variety of copolymers.

The positive electrode active material layer 324 may be a porous structure in which the gas generating material 325 is bonded and immobilized by the binder, and pores are formed by voids in the gas generating material 325. The porous structure having the pores formed as described above increases the reaction area with the electrolyte, in particular, the electrolyte solution in the assembled battery. Accordingly, much more gas may be generated. Pores that are not filled with the electrolyte solution may form a movement channel through which the generated gas diffuses out. For the gas generating material 325 to work efficiently, it is important to increase the reaction area of the positive electrode active material layer 324. It is desirable to have a wide surface area even though it is formed at a narrow area. To this end, many small pores may be formed in the positive electrode active material layer 324, and for example, a desired result may be reached by adjusting the size of the gas generating material 325 particles.

The positive electrode plate 320 of the current shut-off battery cell 300 may further include an additive such as a filler in the positive electrode active material layer 324, if necessary. The filler is optionally used to suppress the expansion of the positive electrode active material layer 324, and is not limited to any particular type when it is a fibrous material while not causing a chemical change to the corresponding battery, and may include, for example, olefin-based polymers such as polyethylene and polypropylene; and fibrous materials such as glass fiber and carbon fiber.

The positive electrode current collector 322 is generally 3~500 μm thick. The positive electrode current collector 322 is not limited to any particular type when it has high conductivity while not causing a chemical reaction to the corresponding battery, and may include, for example, stainless steel, aluminum, nickel, titanium, sintered carbon, or aluminum or stainless steel treated with carbon, nickel, titanium and silver on the surface. The positive electrode current collector 322 may have fine surface texture to increase the adhesive strength of the positive electrode active material, and may have various forms such as a film, a sheet, a foil, a net, a porous body, a foam and a nonwoven.

The negative electrode plate included in the electrode assembly 310 of the current shut-off battery cell 300 may be manufactured by applying a negative electrode active material slurry onto a negative electrode current collector, drying and pressing, and optionally, may further include a conductive material, a binder and a filler as described above if necessary. The negative electrode current collector is generally 3~500 μm thick. The negative electrode current collector is not limited to any particular type when it has conductivity while not causing a chemical reaction to the corresponding battery, and may include, for example, copper, stainless steel, aluminum, nickel, titanium, sintered carbon, copper or stainless steel treated with carbon, nickel, titanium and silver on the surface, and aluminum-cadmium alloys. Additionally, similar to the positive electrode current collector 322, the negative electrode current collector may have fine surface texture to enhance the bond strength of the negative electrode active material, and may have various forms such as a film, a sheet, a foil, a net, a porous body, a foam and a nonwoven.

The negative electrode active material may include, for example, carbon such as non-graphitizable carbon and graphite-based carbon; metal composite oxide such as $Li_xFe_2O_3(0 \leq x \leq 1)$, $Li_xWO_2(0 \leq x \leq 1)$, $Au_xMe_{1-x}Me'_yO_z$ (Me: Mn, Fe, Pb, Ge; Me': Al, B, P, Si, elements of Groups 1, 2 and 3 in the periodic table, halogen; $0<x<1$; $1<y<3$; $1<z<8$); lithium metal; lithium alloys; silicon-based alloys; tin-based alloys; metal oxide such as AuO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni based materials; titanium oxide; and lithium titanium oxide.

In the current shut-off battery cell 300, the separator is interposed between the positive electrode plate 320 and the negative electrode plate, and may include an insulating thin film having high ion permeability and mechanical strength, but is not limited thereto. Generally, the separator has a pore diameter of 0.01~10 μm, and a thickness of 5~300 μm. The separator may include, for example, chemical-resistant and hydrophobic olefin-based polymers such as polypropylene; and sheets or nonwovens made of glass fiber or polyethylene. When a solid electrolyte such as polymer is used as the electrolyte, the solid electrolyte may serve as the separator.

The electrolyte solution used in the current shut-off battery cell 300 may include an electrolyte solution and a lithium salt, and the electrolyte solution may include a nonaqueous organic solvent, an organic solid electrolyte and an inorganic solid electrolyte, but is not limited thereto.

The nonaqueous organic solvent may include, for example, aprotic organic solvents such as N-methyl-2-pyrrolidinone, propylene carbonate, ethylene carbonate, butylene carbonate, dimethyl carbonate, diethyl carbonate, gamma butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

The organic solid electrolyte may include, for example, polyethylene derivatives, polyethylene oxide derivatives, polypropylene oxide derivatives, phosphoric acid ester polymers, poly agitation lysine, polyester sulfide, polyvinyl alcohol, polyvinylidene fluoride, and polymers containing ionic dissociation groups.

The inorganic solid electrolyte may include, for example, nitrides, halides and sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is apt to dissolve in the nonaqueous electrolyte, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloro borane lithium, lower aliphatic carboxylic acid lithium, lithium tetraphenyl borate and imide.

Additionally, to improve the charging/discharging characteristics and flame retardancy, for example, pyridine, triethylphosphite, triethanolamine, cyclic ether, ethylene diamine, n-glyme, triamide hexaphosphate, nitrobenzene derivatives, sulfur, quinone imine dye, N-substituted oxazolidinone, N,N-substituted imidazolidine, ethylene glycol dialkyl ether, ammonium salts, pyrrole, 2-methoxy ethanol and aluminum trichloride may be added to the electrolyte solution. In some cases, a halogen containing solvent such as carbon tetrachloride and trifluoroethylene may be added to give non-combustibility, carbon dioxide gas may be added to improve high temperature storage characteristics, and Fluoro-Ethylene Carbonate (FEC) and Propene sultone (PRS) may be further included.

Figure 9:
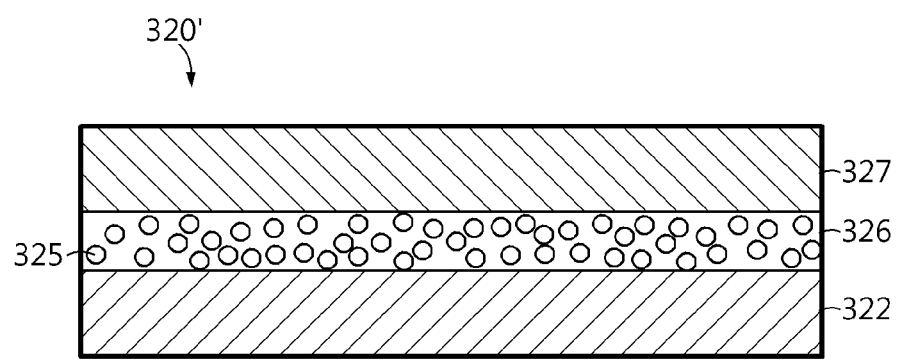
FIG. 9 is a cross-sectional view illustrating another embodiment of a positive electrode plate in an electrode assembly included in the current shut-off battery cell of FIG. 6.

FIG. 9 is a cross-sectional view illustrating another embodiment of the positive electrode plate in the electrode assembly included in the current shut-off battery cell of FIG. 6.

Referring to FIG. 9, the positive electrode plate 320' includes a positive electrode current collector 322, a primer layer 326 and an active material coating layer 327.

The primer layer 326 is formed on the positive electrode current collector 322, and includes a gas generating material 325, a conductive material and a binder. The active material coating layer 327 is formed on the primer layer 326, and includes a positive electrode active material, a conductive material and a binder. This is, in this embodiment, the gas generating material 325 is not included in the active material coating layer 327.

Accordingly, in forming the positive electrode plate 320', the gas generating material 325 is introduced into a binder solution together with the conductive material and shaken to prepare a gas generating material slurry which is then coated on at least one of two surfaces of the positive electrode current collector 322 to form the primer layer 326 first, and then a positive electrode active material slurry including the positive electrode active material, the conductive material and the binder is formed and coated on the primer layer 326 to form the active material coating layer 327.

In this instance, the gas generating material 325 is desirably present in an amount of 90 to 99.9 weight % of the solids in the primer layer 326. When the amount of the gas generating material 325 is lower than the lower bound, the electrical resistance may insufficiently increase, and when the amount of the gas generating material 325 is higher than the upper bound, bonds between components or electrical conductivity may be insufficient.

For the remaining matters, those described with reference to FIG. 8 above may be equally used.

In this embodiment, gas is generated in the primer layer 326 between the positive electrode current collector 322 and the active material coating layer 327. Accordingly, the current shut-off battery cell 300 may reach the overcharge end voltage quickly, and the battery module 1000 including the current shut-off battery cell 300 may ensure safety.

Figure 10:
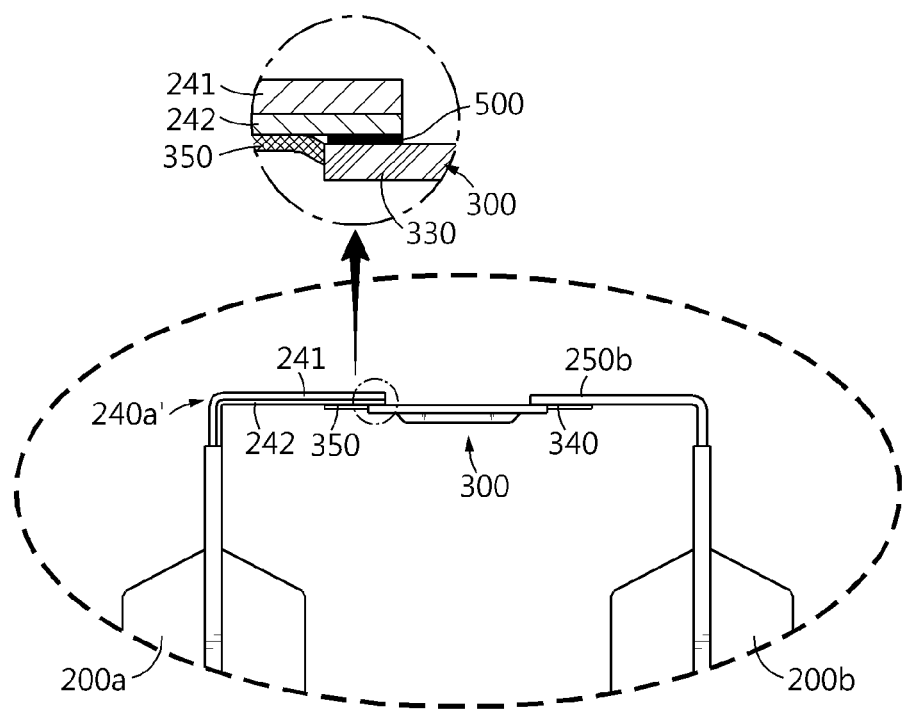
FIG. 10 is a schematic diagram showing an embodiment in which a current shut-off battery cell is connected between adjacent two battery cells according to another embodiment of the present disclosure.

In the previous embodiments, the current shut-off battery cell follows the gas generation principle. In another embodiment, the current shut-off battery cell may use a bimetal that bends in response to a temperature rise. For example, the use of the bimetal in the first battery cell 200a or the second battery cell 200b adjacent to each other in the battery module 1000 as shown in FIG. 4 or the electrode lead of the current shut-off battery cell 300 allows the electrode lead to bend in response to a temperature rise in the event of overcharge, and the pouch case 330 of the current shut-off battery cell 300 to break and rupture. FIG. 10 shows an example in which the positive electrode lead 240a' of the first battery cell 200a is made of a bimetal.

Referring to FIG. 10, the positive electrode lead 240a' of the first battery cell 200a is made of a bimetal, and the end of the positive electrode lead 240a' is attached to the current shut-off battery cell 300 through an adhesive element 500.

The bimetal is manufactured such that a metal having a high coefficient of thermal expansion forms a lower part 242 of the lead and is connected to the negative electrode lead 350 of the current shut-off battery cell 300, and a metal having a low coefficient of thermal expansion forms an upper part 241 of the lead. Non-limiting examples of the metal having a high coefficient of thermal expansion may include copper/zinc alloys, nickel/molybdenum/iron alloys and nickel/manganese/iron alloys, but is not limited thereto. Non-limiting examples of the metal having a low coefficient of thermal expansion may include nickel/iron alloys, but is not limited thereto.

The adhesive element 500 is not limited to a particular type and includes any type commonly used in the art, and may be, for example, a double-sided insulation tape or adhesive.

The positive electrode lead 240a' of the first battery cell 200a made of the bimetal bends in a direction facing away from the current shut-off battery cell 300 due to a difference in coefficient of thermal expansion when heat is generated by overcharge, and in this instance, the pouch case 330 of the current shut-off battery cell 300 attached to the positive electrode lead 240a' of the first battery cell 200a ruptures by the adhesive element 500, thereby shutting off the current more easily.

Meanwhile, although this embodiment describes that the positive electrode lead 240a' of the first battery cell 200a is made of a bimetal, and of course, the electrode lead of the current shut-off battery cell 300 may be made of a bimetal. In this instance, because there is no change in battery cell, a mass production advantage or no change in resistance on cell scale will be better than the previous embodiment.

According to the configuration of the present disclosure described above, because the current shut-off battery cell is included in the lead connected part, the current shut-off battery cell ruptures to shut off the current flow in the event of overcharge. Accordingly, for example, even though the overcharge prevention function of the secondary battery protection circuit does not normally work, it is possible to shut off the current flow to stop charging. Additionally, because the current shut-off battery cell is included in the lead connected part, it is not necessary to allocate a separate space for mounting the current shut-off battery cell.

The battery module according to the present disclosure has high safety, and thus is suitable for use in a power source of a medium- and large-scale device that requires high temperature stability, long cycle characteristics and high rate characteristics. Preferable examples of the medium- and large-scale device may include power tools that operate with power from an electric motor; electric vehicles including Electric Vehicles (EVs), Hybrid Electric Vehicles (HEVs), Plug-in Hybrid Electric Vehicles (PHEVs); electric two wheelers including E-bikes and E-scooters; electric golf carts; and ESSs, but is not limited thereto.

While the present disclosure is hereinafter described in detail by describing the overcharge test results according to the experimental example of the present disclosure, the scope of the present disclosure is not limited thereby.

After the size of a commercially available battery is reduced on laboratory scale to manufacture battery cells 200a, 200b and a smaller current shut-off battery cell 300 is manufactured, electrode leads are connected to manufacture an experimental unit module as shown in FIG. 7, and an overcharge test is performed. The methods of manufacturing the battery cells 200a, 200b and the current shut-off battery cell 300 are based on a general method of manufacturing a pouch-type secondary battery.

The method of manufacturing the battery cells 200a, 200b is as follows. $LiCoO_2$ having D50 of about 15~20 μm as a positive electrode active material, Super P as a conductive material and polyvinylidene fluoride as a binder polymer are mixed at a 92:4:4 weight ratio, and N-methyl pyrrolidone (NMP) is added thereto, to prepare a positive electrode active material slurry. The positive electrode active material slurry prepared as described above is applied to a positive electrode current collector of an aluminum foil, and dried in a vacuum oven of 120° C. to manufacture a positive electrode plate.

Meanwhile, mesocarbon microbead (MCMB) is used for a negative electrode active material, super P for a conductive material and PVdF as a binder, and they are mixed at a 92:2:6 ratio (weight ratio) and dispersed in NMP to prepare a negative electrode active material slurry which is then coated on a negative electrode current collector of a copper foil and dried to manufacture a negative electrode plate.

An electrode assembly is manufactured using a polyethylene separator between the positive electrode plate and the negative electrode plate manufactured as described above. The electrode assembly is connected to an electrode lead and put into a pouch case, a solution containing 1 M $LiPF_6$ dissolved in a mixture of ethylene carbonate (EC) and dimethyl carbonate (DMC) of a 1:1 volume ratio is injected as an electrolyte, and the pouch case is hermetically sealed.

The method of manufacturing the current shut-off battery cell 300 is similar to the previous method of manufacturing the battery cells 200a, 200b, except that the positive electrode active material layer further include a gas generating material, and the current shut-off battery cell 300 is as small and thin as the electrode lead of the battery cells 200a, 200b. For the gas generating material, lithium carbonate having a particle size of 5.0 μm is used.

To bring into the connected state shown in FIG. 7, the electrode lead of the battery cell 200a and the electrode lead of the current shut-off battery cell 300 are connected by ultrasonic welding, and the other electrode lead of the current shut-off battery cell 300 is connected to the electrode lead of the battery cell 200b to establish a series connection.

The overcharge test is performed in two steps on unit modules connected in series. First, CC-CV charging is performed up to SOC 100% at normal temperature (25° C.) and pressure (First step: SOC 100% setting), and for the overcharge test, CC charging continues at normal temperature and pressure with the increasing SOC from SOC 100% to verify if the current shut-off battery cell 300 will shut off the current (Second step: overcharge). The overcharge evaluation uses a charge/discharge tester. Each electrode lead of the battery cells 200a, 200b and the current shut-off battery cell 300 is connected to terminal channels of the charge/discharge tester, and the voltage (full cell voltage) of each battery cell is measured at overcharge. There are commercially available charge/discharge testers from many manufacturers, and for example, equipment such as Hioki HiTester may be used.

Figure 11:
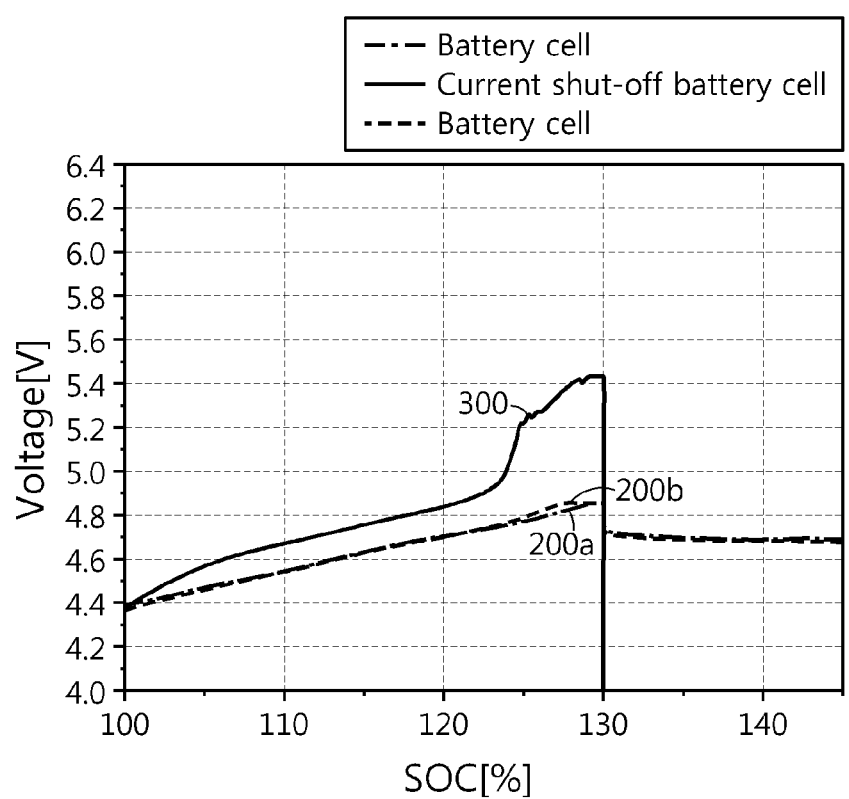
FIG. 11 is a graph showing overcharge test results according to experimental example of the present disclosure.

The results are shown in FIG. 11. FIG. 11 is a graph showing the overcharge test results according to the experimental example of the present disclosure.

Referring to FIG. 11, as overcharge continues from SOC 100%, the voltage of the battery cells 200a, 200b and the current shut-off battery cell 300 slowly increases from about 4.4V. As overcharge continues, the voltage of the current shut-off battery cell 300 increases faster than the voltage of the battery cells 200a, 200b. This is because the current shut-off battery cell 300 is smaller and has lower capacity than the battery cells 200a, 200b. For example, when the battery cells 200a, 200b are a 40 mAh cell, the current shut-off battery cell 300 may be a 10 mAh cell of lower capacity, so the voltage of the current shut-off battery cell 300 increases faster for the same magnitude of charge current input. When the voltage of the current shut-off battery cell 300 increases and then reaches about 4.9V or above, gas is rapidly generated in the current shut-off battery cell 300, and the battery voltage rises rapidly. The current shut-off battery cell 300 has a voltage drop to 0V at the point of SOC 130%. The current shut-off battery cell 300 does not withstand the internal pressure and eventually ruptures, and as a result, it is impossible to measure the voltage of the current shut-off battery cell 300. After SOC 130%, the voltage of the battery cells 200a, 200b is constant and converges to the open-circuit voltage (OCV). This is because the electrical connection path is blocked by the rupture of the current shut-off battery cell 300 even though the charge current is continuously supplied. Accordingly, through this experiment, it could be seen that the current shut-off battery cell 300 effectively acts as a safety element at SOC 130% in an overcharge situation in which the voltage of the battery cells 200a, 200b is 4.8V or above.

Figure 12:
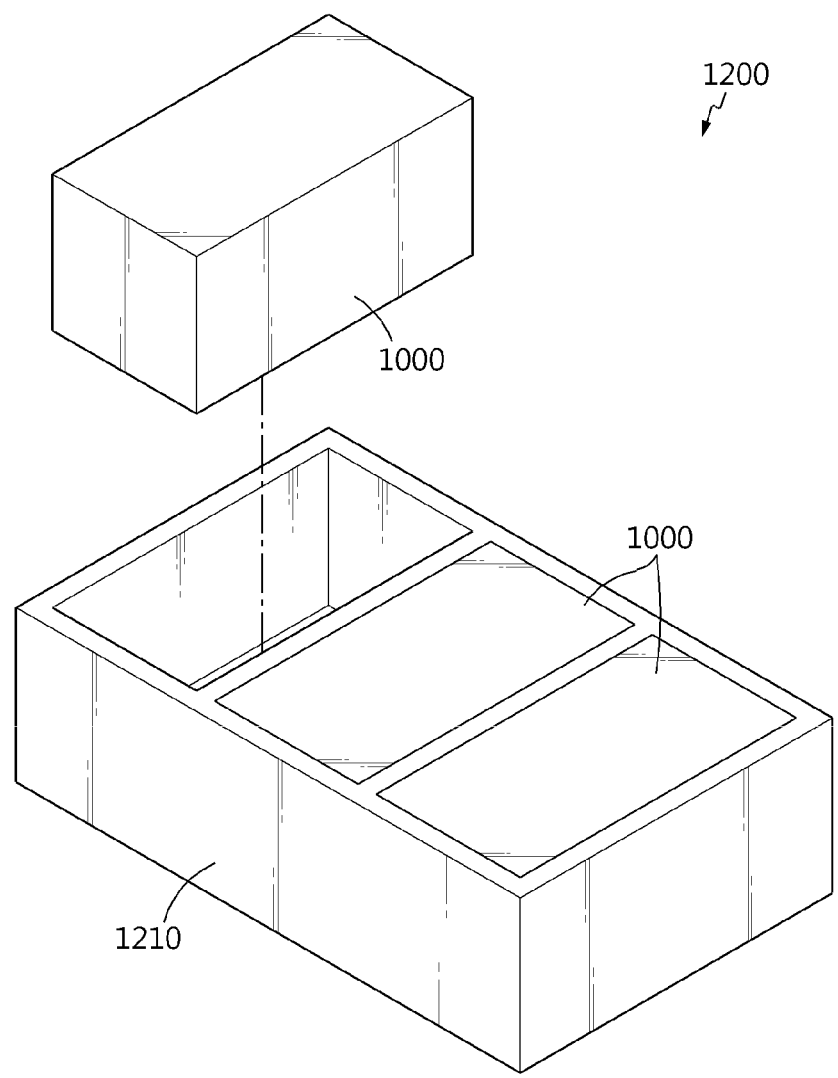
FIG. 12 is a diagram illustrating a battery pack according to an embodiment of the present disclosure.
Figure 13:
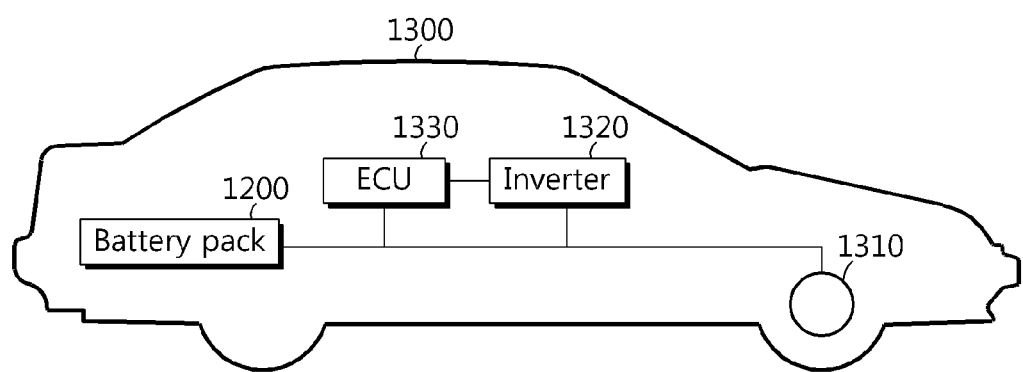
FIG. 13 is a diagram illustrating a vehicle according to an embodiment of the present disclosure.

FIG. 12 is a diagram illustrating a battery pack according to an embodiment of the present disclosure. FIG. 13 is a diagram illustrating a vehicle according to an embodiment of the present disclosure.

Referring to FIGS. 12 and 13, the battery pack 1200 may include at least one battery module according to the previous embodiment, for example, the battery module 1000 of the second embodiment and a pack case 1210 to package it. In addition to the battery module 1000 and the pack case 1210, the battery pack 1200 according to the present disclosure may further include various types of devices to control the charge/discharge of the battery module 1000, for example, a Battery Management System (BMS), a current sensor and a fuse.

The battery pack 1200 may be provided in the vehicle 1300 as a source of fuel for the vehicle 1300. For example, the battery pack 1200 may be provided in the vehicle 1300 such as electric vehicles, hybrid electric vehicles, and in any other way of using the battery pack 1200 as a source of fuel.

Preferably, the vehicle 1300 may be an electric vehicle. The battery pack 1200 may be used as an electrical energy source that supplies power to a motor 1310 of the electric vehicle to drive the vehicle 1300. In this case, the battery pack 1200 has a high nominal voltage of 100V or above. For the use of hybrid electric vehicles, it is set to 270V.

The battery pack 1200 may be charged or discharged by an inverter 1320 according to the operation of the motor 1310 and/or the internal combustion engine. The battery pack 1200 may be charged by a regenerative charger connected to the brake. The battery pack 1200 may be electrically connected to the motor 1310 of the vehicle 1300 through the inverter 1320.

As described previously, the battery pack 1200 also includes a BMS. The BMS estimates the state of the battery cells in the battery pack 1200, and manages the battery pack 1200 using the estimated state information. For example, the BMS estimates and manages the state information of the battery pack 1200 such as State Of Charge (SOC), State Of Health (SOH), maximum allowable input/output power and output voltage of the battery pack 1200. Additionally, using the state information, the BMS may control the charge or discharge of the battery pack 1200, and further, estimate when to replace the battery pack 1200.

An ECU 1330 is an electronic control device that controls the state of the vehicle 1300. For example, the ECU 1330 determines torque information based on information of the accelerator, brake, speed, etc., and controls the output of the motor 1310 according to the torque information. Additionally, the ECU 1330 sends a control signal to the inverter 1320 based on the state information such as SOC, SOH, etc. of the battery pack 1200 received by the BMS to charge or discharge the battery pack 1200. The inverter 1320 allows the battery pack 1200 to be charged or discharged based on the control signal of the ECU 1330. The motor 1310 drives the vehicle 1300 based on the control information (for example, torque information) received from the ECU 1330 by using electrical energy of the battery pack 1200.

The vehicle 1300 includes the battery pack 1200 according to the present disclosure, and the battery pack 1200 includes the battery module 1000 with improved safety as previously described. Accordingly, stability of the battery pack 1200 is improved, and the battery pack 1200 has high stability and can be used for a long term, and thus the vehicle 1300 including the same is safe and easy to drive.

In addition to the vehicle 1300, the battery pack 1200 may be provided in other types of devices, apparatus and equipment using secondary batteries such as ESS BMS.

As described above, the battery pack 1200 according to this embodiment and the device, apparatus and equipment including the battery pack 1200 such as the vehicle 1300 include the above-described battery module 1000, and thus it is possible to implement the battery pack 1200 having all the advantages of the above-described battery module 1000 and the device, apparatus and equipment including the battery pack 1200 such as the vehicle 1300.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

What is claimed is:

1. A battery module comprising:
   two or more battery cells, including a first battery cell and a second battery cell; and
   a current shut-off battery cell providing an electrical connection between the first battery cell and the second battery cell, the current shut-off battery cell having a case,
   wherein, when overcharge occurs, the case of the current shut-off battery cell ruptures to disconnect the electrical connection,
   wherein each of the first battery cell and a second battery cell have a first electrode lead with a bent part, and
   wherein the current shut-off battery cell is smaller or thinner than either of the first battery cell and the second battery cell so that the current shut-off battery cell is disposed between the bent parts of each first electrode lead while not affecting a distance between the first battery cell and the second battery cell.

2. The battery module according to claim 1, wherein each of the first battery cell and the second battery cell is a pouch-type secondary battery having a second electrode and an electrode assembly having two ends, the two ends respectively connected to a first end of the first electrode lead and a first end of the second electrode lead,
   wherein each electrode assembly is received in a case together with an electrolyte solution and the case is hermetically sealed, and
   wherein a second end of each electrode lead is exposed outside of the case.

3. The battery module according to claim 1, wherein the first battery cell and the current shut-off battery cell are connected in series, and the current shut-off battery cell and the second battery cell are connected in series.

4. The battery module according to claim 2, wherein the first electrode lead of the first battery cell and the first electrode lead of the second battery cell are connected to each other by electrode leads of the current shut-off battery cell.

5. The battery module according to claim 4, wherein the first battery cell and the second battery cell are stacked in an alternating manner in a stack direction such that each alternating electrode lead has opposite polarities, and the second end of the first electrode lead of the first battery cell and the second end of the first electrode lead of the second battery cell are bent facing each other along the stack direction, and the current shut-off battery cell is placed in parallel to the stack direction.

6. The battery module according to claim 1, wherein an electrode assembly of the current shut-off battery cell has a stack of a negative electrode plate, a separator and a positive electrode plate, wherein the positive electrode plate includes:
   a positive electrode current collector; and
   a positive electrode active material layer formed on the positive electrode current collector,
   wherein the positive electrode active material layer includes a positive electrode active material, a gas generating material, a conductive material and a binder.

7. The battery module according to claim 6, wherein the gas generating material is one selected from the group consisting of lithium carbonate ($Li_2CO_3$), calcium carbonate ($CaCO_3$), Lithium Nickel Oxide (LNO) and lithium oxalate, or mixtures thereof.

8. The battery module according to claim 6, wherein the gas generating material is included in the positive electrode plate in an amount of 0.1 to 20 weight % based on the total weight of the positive electrode active material and the gas generating material.

9. The battery module according to claim 6, wherein the gas generating material is bonded and immobilized by the binder, and pores are formed by voids in the gas generating material.

10. The battery module according to claim 6, wherein the positive electrode active material and the gas generating material are blended together.

11. The battery module according to claim 6, wherein the positive electrode active material layer includes a primer layer and an active material coating layer,
    wherein the primer layer includes the gas generating material, the conductive material and the binder, and
    wherein the active material coating layer includes the positive electrode active material, the conductive material and the binder.

12. The battery module according to claim 11, wherein the gas generating material is present in an amount of 90 to 99.9 weight % of solids in the primer layer.

13. The battery module according to claim 2, wherein the first electrode lead of the first battery cell or the first electrode lead of the second battery cell is made of a bimetal,
    wherein the bimetal has a stack of a first metal having a high coefficient of thermal expansion and a second metal having a low coefficient of thermal expansion,
    the first metal having a high coefficient of thermal expansion is coupled with the electrode lead of the current shut-off battery cell, and
    an end of the first metal having a high coefficient of thermal expansion is adhered to the case of the current shut-off battery cell by an adhesive element.

14. A battery pack comprising:
    at least one battery module according to claim 1; and
    a pack case which houses the at least one battery module.

15. A vehicle comprising:
    at least one battery pack according to claim 14.

16. A battery module comprising:
    two or more battery cells, including a first battery cell and a second battery cell; and
    a current shut-off battery cell providing an electrical connection between the first battery cell and the second battery cell, the current shut-off battery cell having a case,
    wherein, when overcharge occurs, the case of the current shut-off battery cell ruptures to disconnect the electrical connection,
    wherein the first battery cell and the second battery cell are stacked in a lateral direction, and
    wherein the current shut-off battery cell is located above the first battery cell and the second battery cell.

17. The battery module according to claim 1, wherein the first battery cell and the second battery cell each have a positive terminal and a negative terminal extending from a case and spaced apart in a first direction, and
    wherein the current shut-off battery cell has a positive terminal and a negative terminal extending from the case of the current shut-off battery cell spaced apart in a second direction perpendicular to the first direction.

18. The battery module according to claim 1, wherein the first electrode is drawn from the first battery cell at a point a first distance from where the first electrode lead is drawn from the second battery cell, and wherein a largest dimension of the current shut-off battery cell is less than the first distance.

* * * * *